United States Patent [19]

Adachi

[11] Patent Number: 5,504,320
[45] Date of Patent: Apr. 2, 1996

[54] BAR-CODE INFORMATION READING APPARATUS

[75] Inventor: Yutaka Adachi, Tokyo, Japan

[73] Assignee: Olympus Optical Co., Ltd., Tokyo, Japan

[21] Appl. No.: 215,418

[22] Filed: Mar. 18, 1994

[30]  Foreign Application Priority Data

Mar. 19, 1993 [JP] Japan .................................. 5-059958
Mar. 22, 1993 [JP] Japan .................................. 5-061765
May 28, 1993 [JP] Japan .................................. 5-126647

[51] Int. Cl.$^6$ .................................................... G06K 7/10
[52] U.S. Cl. .................................................... 235/463
[58] Field of Search ............................................ 235/463

[56]  References Cited

U.S. PATENT DOCUMENTS 4,855,581  8/1989  Mertel ..................................... 235/463
5,036,183  7/1991  Ouchi et al. .

5,336,874  8/1994  Hasegawa ................................ 235/466

FOREIGN PATENT DOCUMENTS 290578  12/1986  Japan ..................................... 235/463
4-268982  9/1992  Japan .

Primary Examiner—John Shepperd
Attorney, Agent, or Firm—Frishauf, Holtz, Goodman, Langer & Chick

[57]  ABSTRACT

The intensity of light reflected from a bar code constructed by bars and spaces is time-sequentially detected by use of a line sensor, sample-and-hold circuit and binary-coding circuit. Data representing the time-series of bars and spaces is counted by a white/black variation point detector and bar/space width counter and converted into width information. In this case, the bar/space width counter starts the counting operation in response to a count enable signal output after a skip-reading counter has counted a count amount previously set by a skip-reading amount setting section. Thus, when width information is stored into a memory, data obtained after data of the preset width among the width information is stored into the memory.

13 Claims, 17 Drawing Sheets

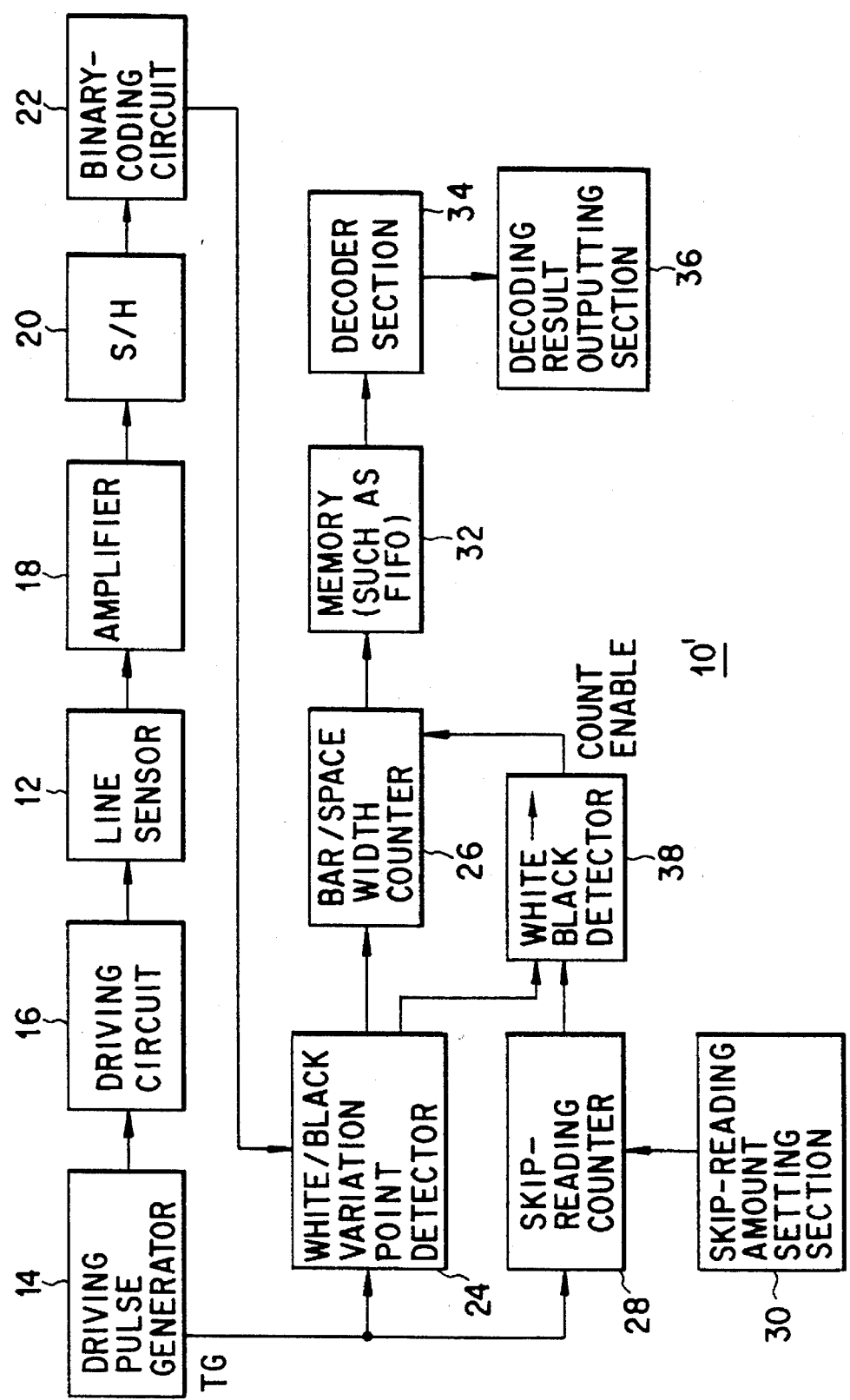
F I G. 6

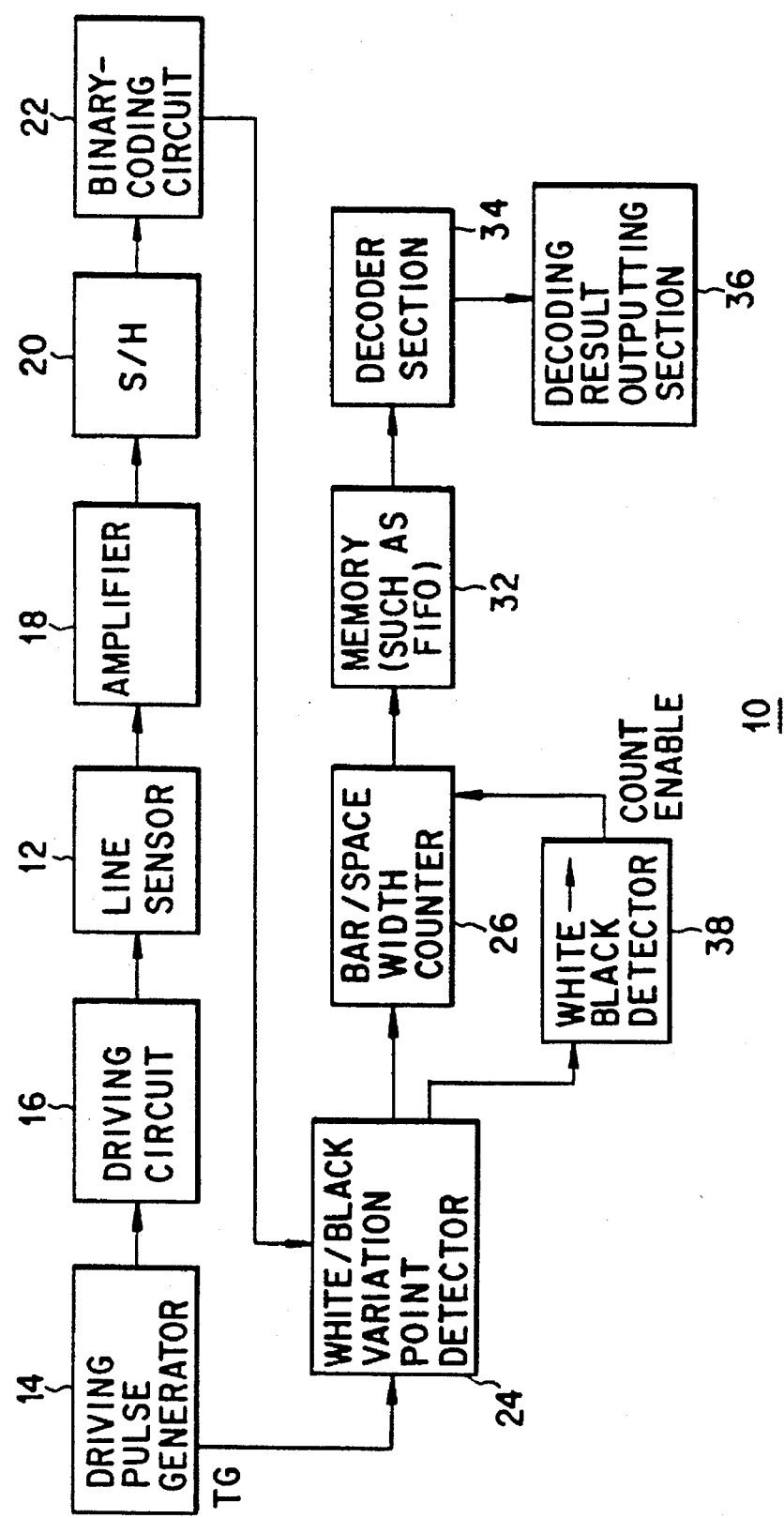
F I G. 6A

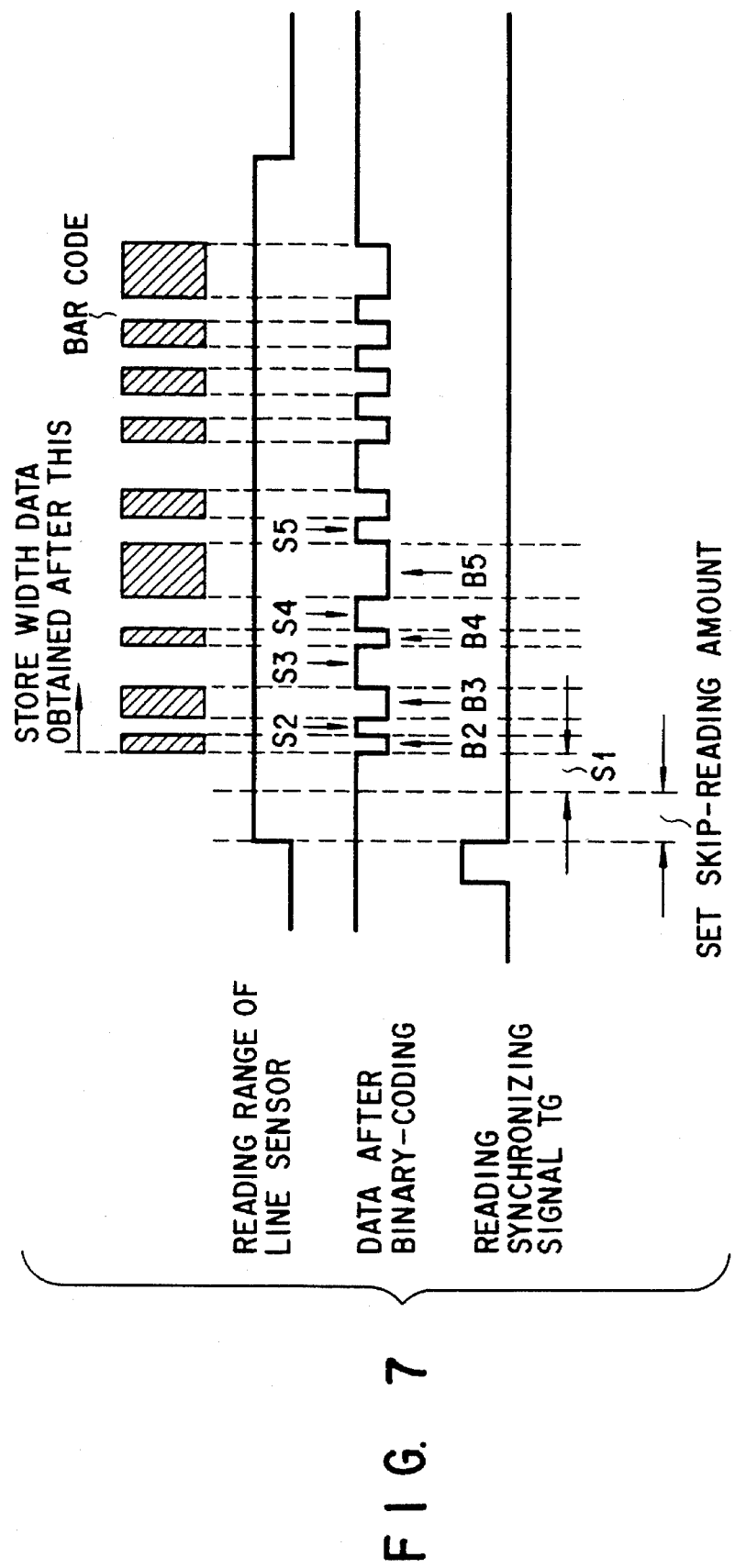

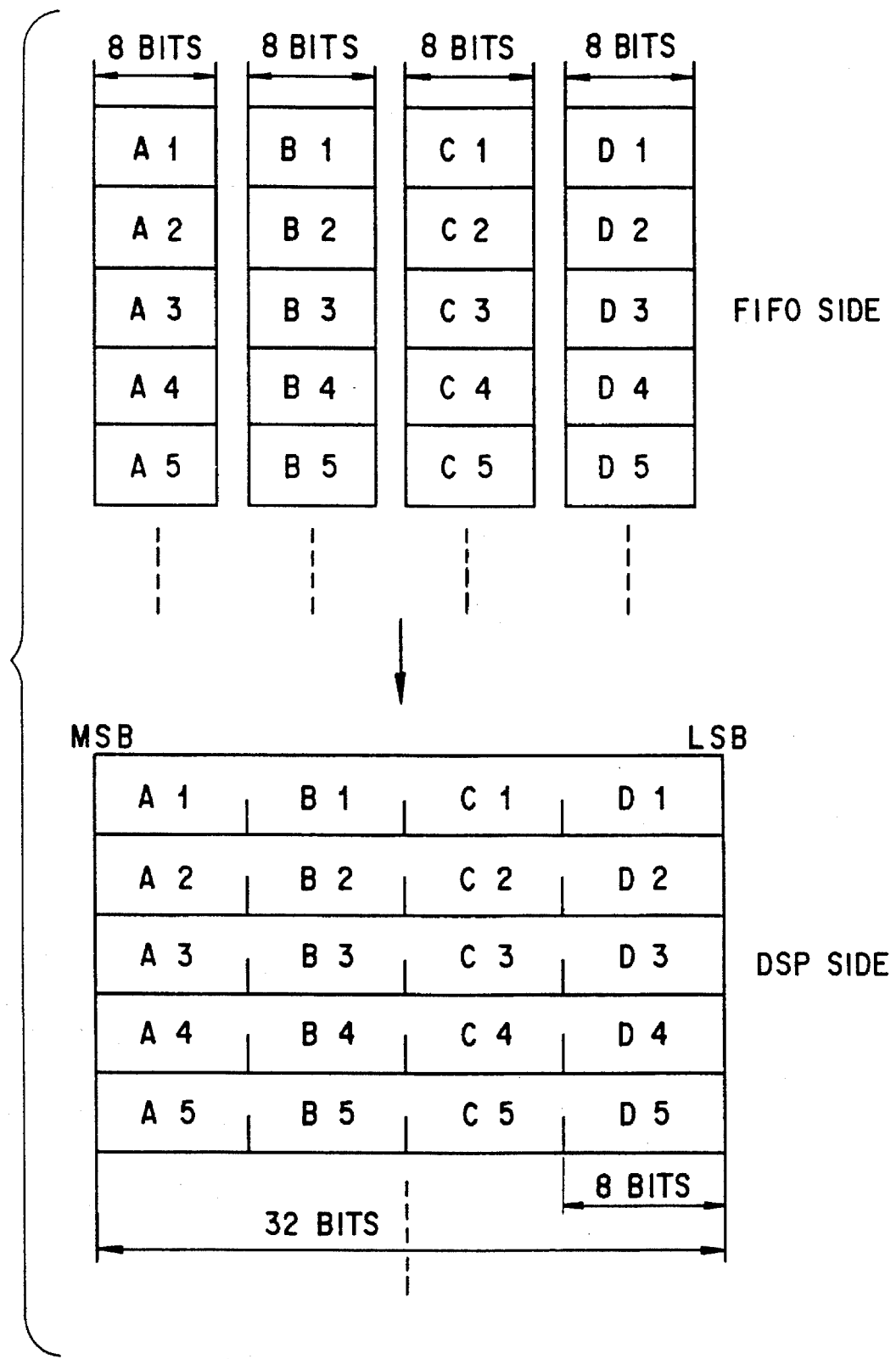
F I G. 13

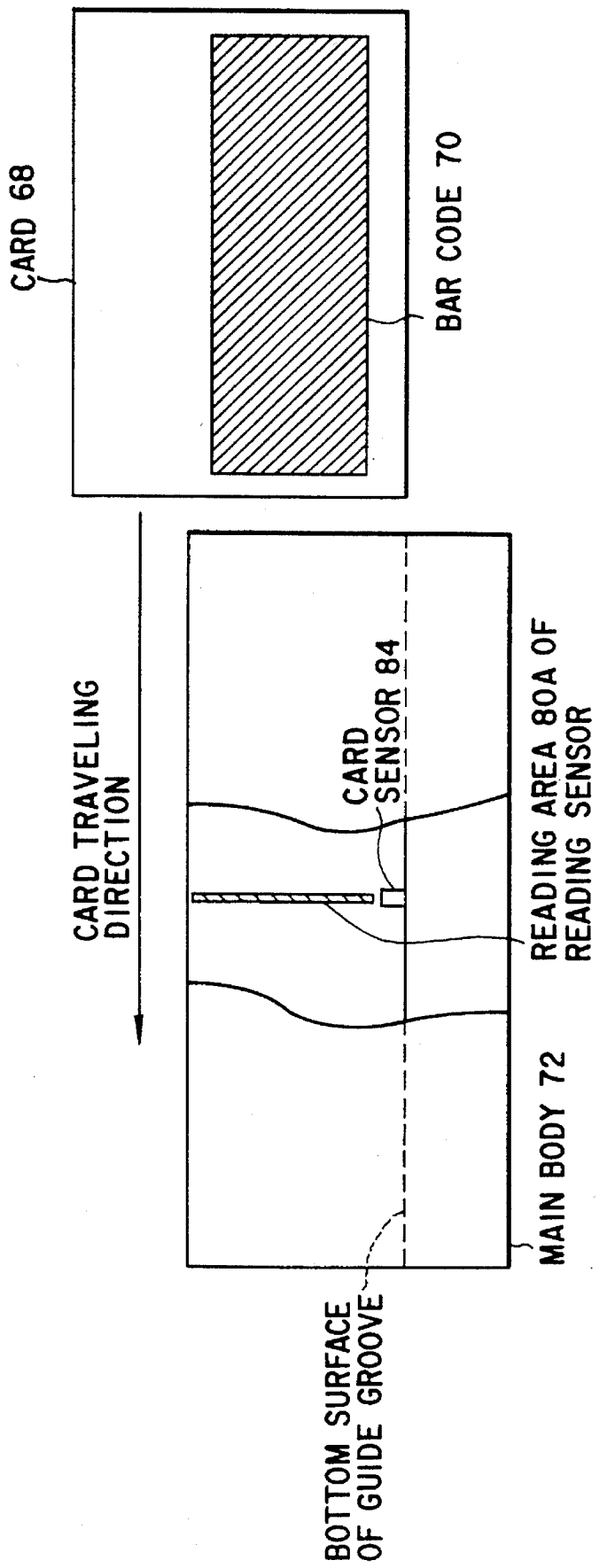
FIG. 22 (SIDE VIEW)

BAR-CODE INFORMATION READING APPARATUS

BACKGROUND OF THE INVENTION

1. Field of the Invention

This invention relates to a bar-code information reading apparatus for reading bar-code information, and more particularly to a bar-code information reading apparatus for storing bar codes into a memory by use of small memory capacity.

2. Description of the Related Art

Conventionally, various types of bar codes are widely used to manage articles, packages and the like.

In a bar-code information reading apparatus for reading and decoding such a bar code, a method of scanning the bar code by use of a laser or picking up an image of the bar code by use of a linear sensor or area sensor is conventionally used as the bar-code reading method. More specifically, in the case of a laser system, a laser beam spot is scanned on the bar code and the intensity of light reflected from the scanned area is sequentially detected. In the case of a linear sensor or area sensor, a bar code image is formed on the sensor by use of an optical system and information of light amount detected by elements of the sensor is serially read.

It is determined by the standard of ordinary bar codes that a blank portion called a quiet zone is provided around the bar code. Therefore, the blank portion in which no bar code is present is first read in the scanning operation when white-and-black information of the bar code is read by the above methods.

However, if the blank portion is large, a large amount of information which is not necessary for decoding the bar code will be read and stored into the memory, the memory capacity is vainly used and time for decoding becomes longer than necessary.

Therefore, various methods of starting the operation of reading and storing bar-code information without reading a large part of the blank portion into the memory are proposed.

For example, in Jpn. Pat. Appln. KOKAI Publication No. 4-268982, a reading apparatus for reading one of bar code information items into a decoding section for decoding when a plurality of bar codes come into the reading area of the line sensor is disclosed. In the reading apparatus disclosed in the above patent specification, only a count value of a bar code having a starting position set in the reading permission range is written into a count value memory and decoded. That is, in the reading apparatus disclosed in the above patent specification, the presence of a bar code is determined when the quiet zone on the starting side is detected and then the operation of reading and storing of the bar-code information is started.

However, in the prior art disclosed in the above patent specification, the quiet zone is used to detect the starting position of the bar code so that the starting position of the bar code cannot be detected and the operation of reading and storing of the bar code cannot be started when the width of the blank portion around the bar code is less than a specified value.

Further, even when the width of the blank portion is equal to or larger than a specified value, only the blank portion of the width smaller than the specified value can be detected when a stain such as void is present, and in this case, the reading and storing operation cannot be started.

In contrast, when the blank portion is excessively large, data of the blank portion prior to starting of the bar code is stored since the reading and storing operation is started after the quiet zone is read in the prior art disclosed in the above patent specification. As a result, a large amount of useless information having no relation to the bar code information is stored into the memory, and thus, the memory capacity of the memory is vainly used and time for decoding becomes longer than necessary.

SUMMARY OF THE INVENTION

This invention has been made in order to solve the above problems, and an object of this invention is to provide a bar-code information reading apparatus which can prevent unnecessary information which is not required for decoding a bar code from being stored into a memory, thereby making it possible to store the bar code into the memory by use of the least memory capacity thereof and prevent the decoding time from being made unnecessarily long.

According to a first aspect of this invention, there is provided a bar-code information reading apparatus comprising detection means for time-sequentially detecting the intensity of reflected light of a bar code constructed by bars and spaces; conversion means for counting data representing the time-series of bars and spaces obtained by the detection means and converting the same into width information; a memory for storing the width information; and storage controlling means for permitting width information after data of a preset width to be stored into the memory.

According to a second aspect of this invention, there is provided a bar-code information reading apparatus comprising detection means for time-sequentially detecting the intensity of reflected light of a bar code constructed by bars and spaces; conversion means for counting data representing the time-series of bars and spaces obtained by the detection means and converting the same into width information; a memory for storing the width information; bar code detecting means for detecting a head portion of the bar code based on data representing the time-series of bars and spaces obtained by the detection means; detection controlling means for operating the bar code detecting means for that part of the data from the detection means which comes after data of a preset width; and storage controlling means for permitting width information after the head portion is detected by the bar code detecting means to be stored into the memory.

According to a third aspect of this invention, there is provided a bar-code information reading apparatus comprising detection means for time-sequentially detecting the intensity of reflected light of a bar code constructed by bars and spaces; conversion means for counting data representing the time-series of bars and spaces obtained by the detection means and converting the same into width information; a memory for storing the width information; bar code detecting means for detecting a head portion of the bar code based on data representing the time-series of bars and spaces obtained by the detection means; and storage controlling means for permitting width information after the head portion is detected by the bar code detecting means to be stored into the memory.

BRIEF DESCRIPTION OF THE DRAWINGS

FIG. 6 is a block diagram showing the construction of a bar-code information reading apparatus according to a second embodiment of this invention using the above first and second methods;

FIG. 6A is a block diagram showing the construction of a bar-code information reading apparatus according to a third embodiment of this invention using the above second method;

FIG. 7 is a diagram showing the relation between an output of a binary-coding circuit in FIG. 6 and data stored in a memory;

FIG. 8 is a diagram showing data stored in the memory shown in FIG. 6;

FIG. 9 is a diagram showing another example of data stored in the memory shown in FIG. 6;

FIG. 13 is a diagram showing the operation of transferring data stored in a FIFO to a DSP side;

FIG. 22 is a view showing still another example of the construction of the bar-code information reading apparatus.

DETAILED DESCRIPTION OF THE PREFERRED EMBODIMENTS

Before describing an embodiment of this invention, the principle of this invention is first explained in order to help understand this invention.

Unlike the conventional reading apparatus, a bar-code information reading apparatus of this invention detects the presence of a bar code without using the quiet zone.

Figure 1:
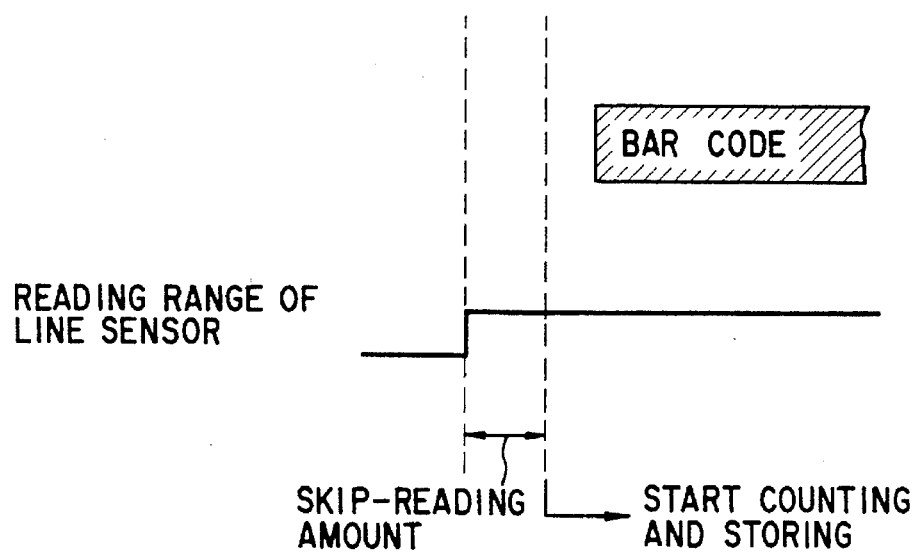
FIG. 1 is a diagram for illustrating the principle of a first method of this invention.

A first concrete method is a method for previously setting and fixing a skip-reading amount or dummy-reading amount as shown in FIG. 1. The first method is effective in a case where the bar code is always set in substantially the same position on a medium on which the bar code is directly drawn or to which a label having the bar code drawn thereon is attached. For example, in a case where a card to which a bar code label having the bar code drawn thereon is attached is moved along the guide to read bar code information, the length of the blank portion from the end of the card to the starting end of the bar code label is substantially determined. In this case, if the skip-reading amount is adequately set, data read and stored after the previously set skip-reading amount is skipped does not substantially contain unnecessary data.

Therefore, according to this method, unnecessary information which is not required for decoding the bar code information can be prevented from being read and stored by dealing with data succeeding a point at which the end of the bar code seems to lie as effective data irrespective of whether the bar code is present or not and storing the data into a memory.

Figure 2:
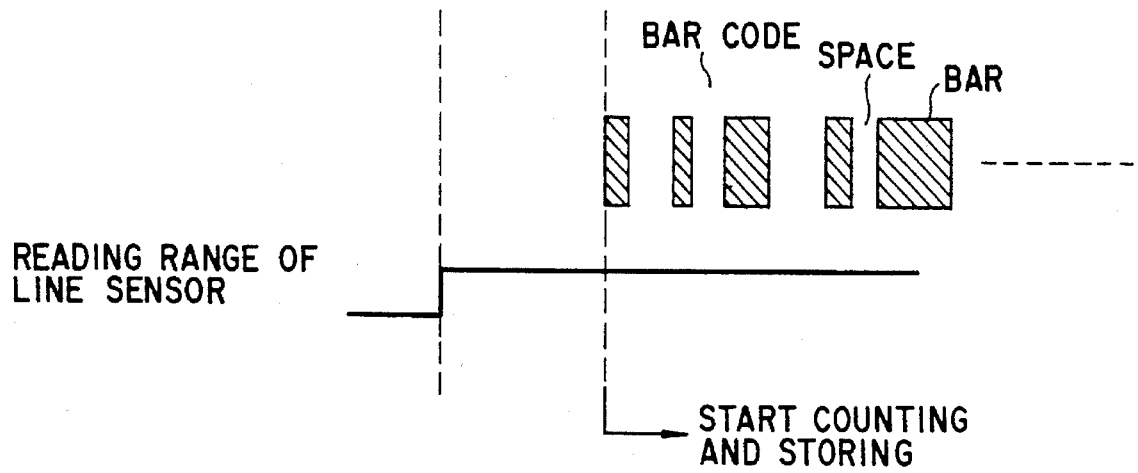
FIG. 2 is a diagram for illustrating the principle of a second method of this invention.

The second method is to store data which is among data time-sequentially read and which lies after a point at which the first white area is changed to the black area as shown in FIG. 2. The bar code is constructed by bars and spaces irrespective of the type thereof and bars are present at the first and last ends. Therefore, the first point of variation from the white area to the black area indicates an edge portion of the first or last bar of the bar code.

According to the second method, since data obtained after the edge portion of the end bar constituting the bar code is stored as effective data, it becomes possible to read and store unnecessary information which is not required for decoding the bar code information.

Further, by simultaneously using the above two methods, it becomes possible to skip the blank portion to the quiet zone portion and detect a point of variation from the white area to the black area after the skipping operation.

There will now be described embodiments of this invention with reference to the accompanying drawings.

Figure 3:
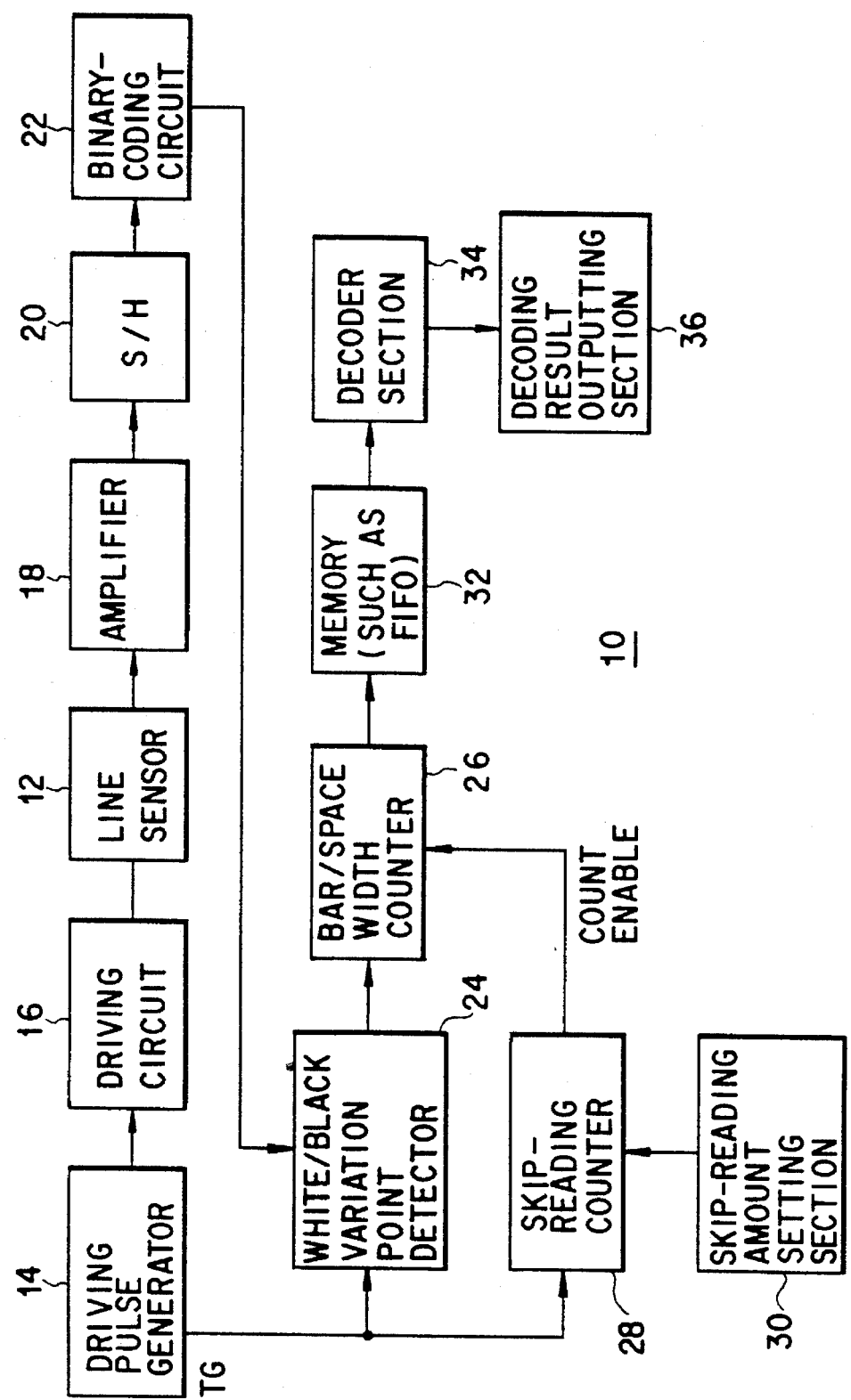
FIG. 3 is a block diagram showing the construction of a bar-code information reading apparatus according to a first embodiment of this invention using the above first method.

FIG. 3 is a block diagram showing the construction of a bar-code information reading apparatus 10 according to a first embodiment of this invention.

That is, the bar-code information reading apparatus 10 includes a line sensor 12, driving pulse generator 14, driving circuit 16, amplifier 18, sample-and-hold (S/H) circuit 20, binary-coding circuit 22, white/black variation point detector 24, bar/space width counter 26, skip-reading counter 28, skip-reading amount setting section 30, memory 32, decoder section 34 and decoding result outputting section 36.

The line sensor 12 is used to pick up the bar code, and the driving pulse generator 14 creates various signals for driving the line sensor 12. The driving circuit 16 subjects the signal created by the driving pulse generator 14 to the adjustment of voltage and current thereof and then supplies the signal to the line sensor 12.

The amplifier 18 amplifies an output signal of the line sensor 12 and the S/H circuit 20 samples the output signal output from the line sensor 12 and amplified by the amplifier 18 and holds the signal level thereof. The binary-coding circuit 22 encodes the signal level held by the S/H circuit 20 into a binary signal and the white/black variation point detector 24 detects the rising edge and falling edge of a data signal output from the binary-coding circuit 22 and gives a start/stop instruction for counting to the bar/space width counter 26. The bar/space width counter 26 counts the bar width or space width in response to the start/stop instruction.

The skip-reading counter 28 outputs a count enable signal for permitting the start of the counting operation to the bar/space width counter 26 after counting a preset counting amount.

The memory 32 stores width data counted by the bar/space width counter 26. The decoder section 34 decodes the width data stored in the memory 32 and the decoding result outputting section 36 outputs the result of decoding by the decoding section 34 to a host computer (not shown).

With the bar-code information reading apparatus 10 of the above construction, the image of a bar code is formed on the line sensor 12 by use of an optical system (not shown). Of course, it is necessary to set the line sensor 12 in the arrangement direction of bars and spaces so as to read the bar width and space width of the bar code. In this case, it is possible to use an area sensor instead of the line sensor 12. For example, when a two-dimensional bar code (such as PDF417) is used, bar code information is drawn in two directions or vertical and horizontal directions, and the whole bar code image can be picked up at one time by using the area sensor when the two-dimensional bar code is read by use of the line sensor, an area to be picked up by the line sensor must be changed so as to read the whole bar code. For simplicity, in this embodiment, a case wherein the linear bar code (such as JAN code) is read by use of the line sensor 12 is explained.

Various signals for driving the line sensor 12 are created by the driving pulse generator 14 and input to the line sensor 12 after subjected to the adjustment of voltage and current in the driving circuit 16.

A difference occurs in the amount of light received by the line sensor 12 according to a difference in the color (reflection factor of light) of black/white of the bar/space of the bar code and is output from the line sensor 12 as a signal having a voltage time sequentially changed. The output signal is generally weak and is amplified by the amplifier 18. Then, signals from stable output portions near the center of pixels among the output signals of the pixels of the line sensor 12 are sampled by the S/H circuit 20, the signal levels are held and encoded into binary values in the binary-coding circuit 22.

Figures 4, 5:
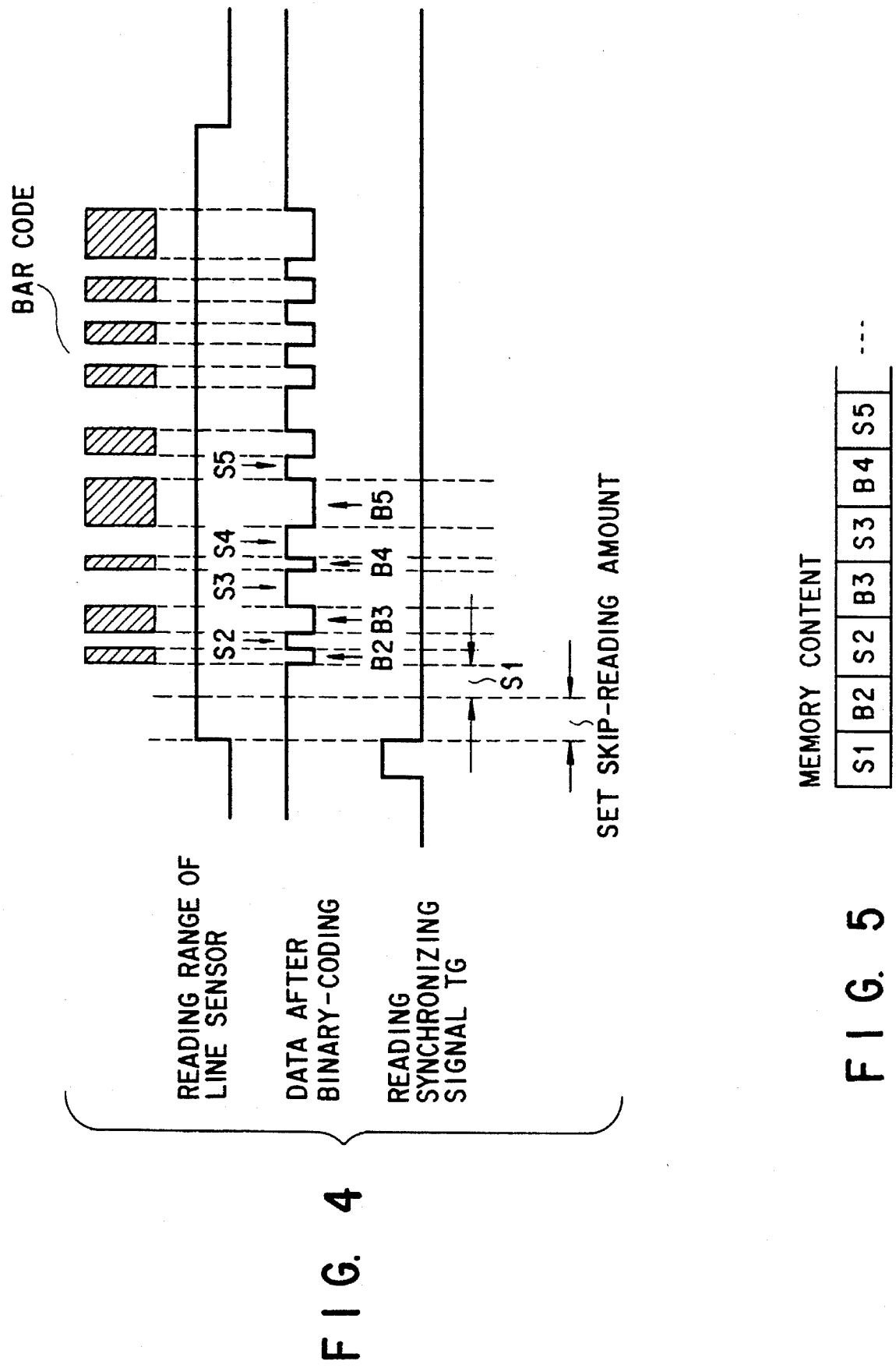
FIG. 4 is a diagram showing the relation between an output of a binary-coding circuit in FIG. 3 and data stored in a memory.
FIG. 5 is a diagram showing data stored in the memory shown in FIG. 3.

One example of an output of the binary-coding circuit 22 is shown in FIG. 4. In this example, the bar portion is expressed by an output signal of low level and the space portion is expressed by an output signal of high level since the intensity of the reflected light from the bar portion is smaller than that of the space portion.

The output signal of the binary-coding circuit 22 is input to the white/black variation point detector 24. The white/black variation point detector 24 detects the rising edge and falling edge of the binary-coded data signal. The edge portion is a point of a signal indicating the boundary between the bar and space when the white/black variation point detector 24 detects the rising edge or falling edge, it gives a counting start/stop instruction to the bar/space width counter 26. Then, the bar/space width counter 26 can start the operation of counting the bar width or space width. A clock used for counting may be a clock synchronized with the clock used in the S/H circuit. However, the operation of the bar/space width counter 26 is started after the skip-reading counter section 28 outputs a count enable signal. The count enable signal is output after the count value set by the skip-reading amount setting section 30 is counted.

Width data thus counted by the bar/space width counter 26 is stored into the memory 32. The memory 32 can be formed by use of a first-in first-out (FIFO) memory, for example.

In FIG. 3, a count enable signal from the skip-reading counter 28 is input to the bar/space width counter 26, but instead it may be input to the memory 32. At this time, the bar/space width counter 26 effects the counting operation irrespective of the count enable signal and data obtained after generation of the count enable signal is stored into the memory 32.

FIG. 5 shows one example of the content of the memory. In FIG. 5, a reference symbol S1 denotes the width of a blank portion on the left side of the left end bar, a reference symbol B2 denotes the width of the first bar, a reference symbol S2 denotes the width of the next space, and in the same manner, the succeeding reference symbols denote the widths of bars and spaces.

That is, the first embodiment is a concrete example of the first method for previously setting and fixing the skip-reading amount by use of the skip-reading amount setting section 30 as shown in FIG. 1.

Therefore, according to the first embodiment, unnecessary information which is not required for decoding the bar code information can be prevented from being stored into the memory by dealing with data obtained after a point at which the end of the bar code seems to be set as effective data irrespective of the presence or absence of the bar code and sequentially storing the data into the memory 32. That is, the information on the widths of bars and spaces of the bar code necessary for decoding the bar code can be efficiently stored into the memory 32. Therefore, the capacity of the hardware such as the memory can be set to a least sufficient capacity and time necessary for decoding can be reduced.

Next, a second embodiment of this invention in which the first and second methods are simultaneously used is explained.

FIG. 6 is a block diagram showing the construction of a bar-code information reading apparatus 10' according to a second embodiment of this invention. In FIG. 6, portions which are the same as those in the first embodiment are denoted by the same reference numerals and the explanation therefor is omitted.

A difference between the first embodiment and the second embodiment is that a white-to-black (white→ black) detector 38 is used to output an enable signal to the bar/space width counter 26. The white-to-black detector 38 detects a first appearing edge of a signal changing from a white area to a black area after the preset skip-reading amount is skipped by the skip-reading counter 28 in response to an output of the white/black variation point detector 24.

With the above construction, the relation between an output of the binary-coding circuit 22 and data stored in the memory 32 is shown in FIG. 7 and data stored in the memory 32 takes a form as shown in FIG. 8.

That is, the second embodiment is a concrete example of the second method for storing data obtained after a first appearing point of variation from a white area to a black area into the memory 32 as shown in FIG. 2 used together with the first method.

Therefore, according to the second embodiment, unnecessary information which is not required for decoding the bar code information can be prevented from being stored into the memory since data obtained after the edge portion of the end bar constructing the bar code is dealt with as effective data.

The second embodiment is an example using a combination of the first and second methods, but it is possible to use only the second method by omitting the construction relating to the first method as illustrated in FIG. 6A. The third embodiment illustrated in FIG. 6A omits the skip reading counter and skip reading setting amount section of FIG. 6 which were used in the first method. Thus as illustrated in FIG. 2 counting starts when the first white to black transition is detected by 38.

Further, as data stored in the memory 32, a value obtained by adding together the widths of the adjacent space and bar, for example, the width between an edge of variation from the space to the bar and a next edge of variation from the space to the bar or the width between an edge of variation from the bar to the space and a next edge of variation from the bar to the space as shown in FIG. 9, may be stored into the memory. The above width counting method can be effectively used even when the printing precision is low and the bar width is larger or smaller than the specified value.

Further, the intensity of reflected light of a laser beam spot used for scanning may be used instead of the CCD video signal. In addition, this invention can be variously modified and can use the method for starting the reading and storing operation of the character scanner.

In the first and second embodiments, as the memory 32, a FIFO is used to store information of the widths of bars and spaces constructing the bar code. The width information can be sufficiently expressed by use of 8-bit data length. In contrast, an MPU serving as the main part in the decoder section 34 can generally deal with a large amount of data, for example, data of 16 bits or 32 bits. However, with the above construction, data transfer from the memory 32 to the decoder section 34 depends on the data length of the memory 32 and the maximum data length of data to be transferred is 8 bits. As a result, time for transferring and decoding becomes long.

Therefore, the method explained in the third embodiment is used in order to solve the above problem of time.

Figure 10:
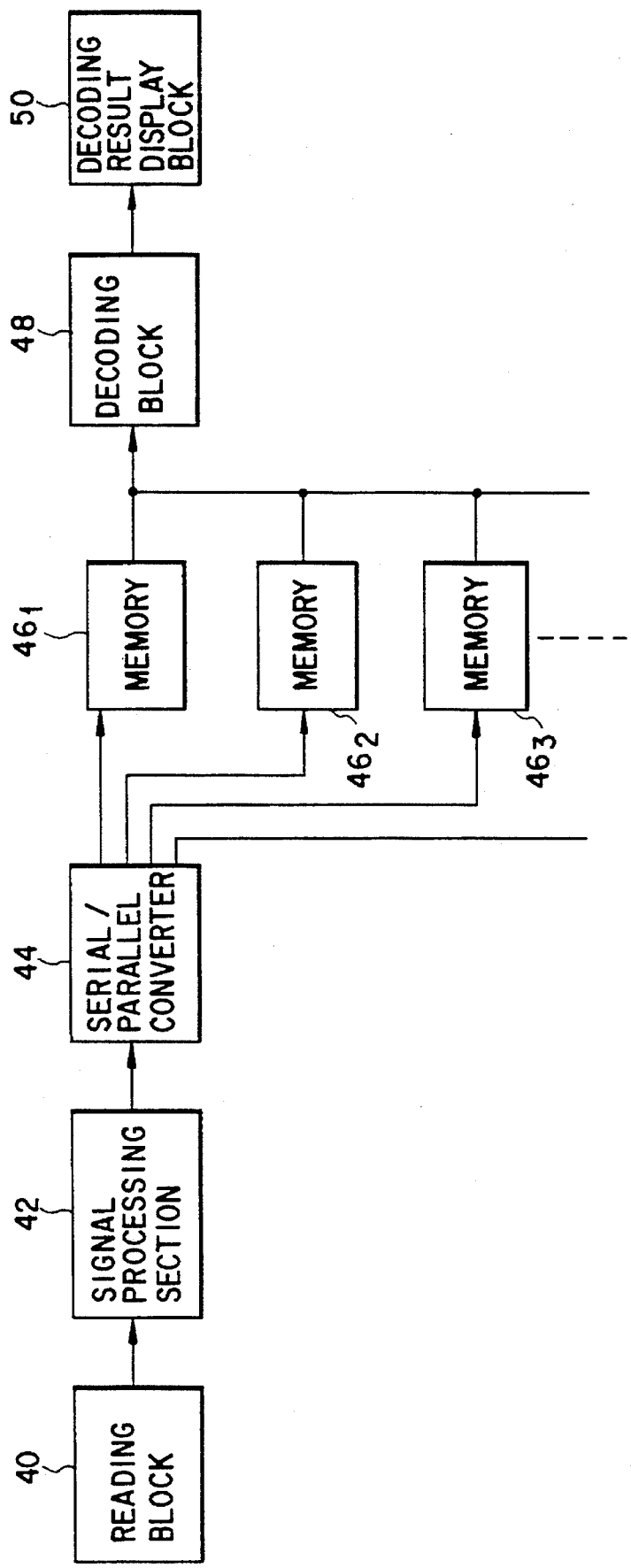
FIG. 10 is a block diagram schematically showing the construction of a bar-code information reading apparatus according to a third embodiment of this invention.

FIG. 10 is a block diagram schematically showing the construction of a bar-code information reading apparatus according to the third embodiment of this invention. The bar-code information reading apparatus of this embodiment includes a reading block 40, signal processing section 42, serial-parallel converter 44, memories $46_1$, $46_2$, $46_3$, - - -, decoding block 48 and decoding result display block 50.

The reading block 40 corresponds to the line sensor 12, driving pulse generator 14 and driving circuit 16, and the signal processing section 42 corresponds to the amplifier 18, S/H circuit 20, binary-coding circuit 22, white/black variation point detector 24, bar/space width counter 26, skip-reading counter 28 and skip-reading amount setting section 30. Further, the decoding block 48 corresponds to the decoder section 34 and the decoding result display block 50 corresponds to the decoding result outputting section 36.

In this embodiment, width information from the signal processing section 42, that is, the bar/space width counter 26 is sequentially stored into the memories $46_1$, $46_2$, $46_3$, - - - arranged in parallel by means of the serial/parallel converter 44. Then, data items are simultaneously read out from the memories $46_1$, $46_2$, $46_3$, - - - arranged in parallel, a plurality of data items are transferred to the decoding block 48, and the decoding process for bar code symbols is effected in the decoding block 48 by use of the information.

In this case, the number of memories arranged in parallel is set to a value obtained by dividing the data length which can be dealt with in the decoding block 48 by the data length of an output of the serial-parallel converter 44. For example, if the data length which can be dealt with in the decoding block 48 is 32 bits and the output of the serial-parallel converter 44 is 8-bit data, it is only necessary to arrange four parallel systems of FIFOs which can deal with 8-bit data length.

With the above construction, since data transfer from the memories $46_1$, $46_2$, $46_3$, - - - to the decoding block 48 is effected by use of all of the data length which can be dealt with by the decoding block 48, data transfer time can be reduced in comparison with the cases in the first and second embodiments.

Now, the third embodiment is explained more in detail with reference to FIGS. 11 to 15.

Figure 11:
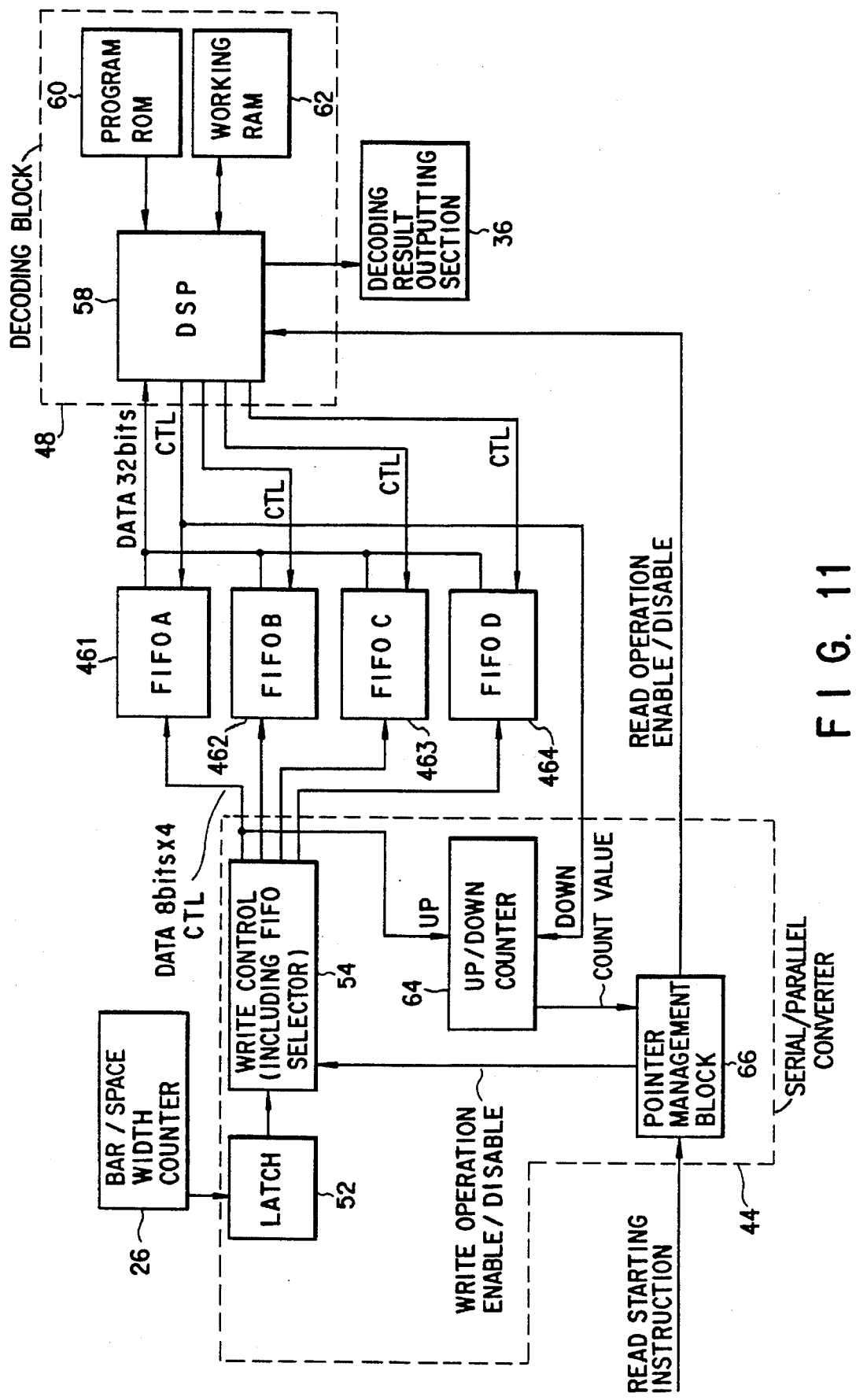
FIG. 11 is a block diagram showing the construction of FIG. 10 in more detail.

FIG. 11 is a block diagram showing the construction of the serial-parallel converter 44, memories $46_1$, $46_2$, $46_3$, - - - and decoding block 48 in FIG. 10 in more detail.

Figure 12:
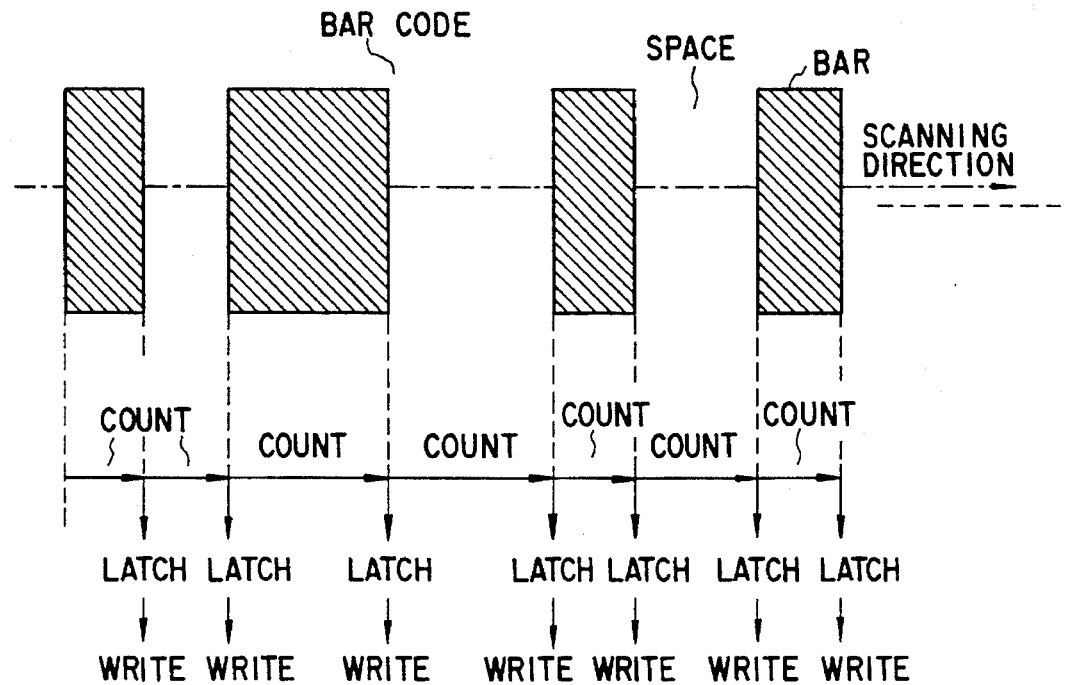
FIG. 12 shows the relation between the counting, latching and writing operations.

As described before, unnecessary information which is not required for decoding the bar code is skipped, and data transfer time from the rising edge to the falling edge and from the falling edge to the rising edge is counted by use of the bar/space width counter 26 and the counted values are used as bar and space width information items. The clock used for the counting may be a clock which is synchronized with the clock used for the S/H circuit 20. The counted width information is latched in a latch 52 and then input to a write control 54. In the write control 54, data serially latched in a preset order is converted into parallel form, transferred to memories $46_1$ to $46_4$ arranged in a parallel form and then stored therein. The relation between the counting, latching and writing operations is shown in FIG. 12.

The memories $46_1$ to $46_4$ may be realized by use of FIFOs, for example. In a specific example of the method for writing data into the memories $46_1$ to $46_4$, an output signal line of the latch 52 is connected in the same manner to all of the memories $46_1$ to $46_4$ arranged in a parallel form. However, data can be sequentially written into the parallel memories $46_1$ to $46_4$ by sequentially switching only the write instruction to the FIFO.

The written data is transferred to a bar code demodulating section 58. In this embodiment, the bar code demodulating section 58 is constructed by a digital signal processor (DSP) as a main part. In this case, another MPU may be used instead of the DSP. Data transfer operations from the memories (FIFOs) $46_1$ to $46_4$ to the bar code demodulating section (DSP) 58 are simultaneously effected and thus the transferred data is input to the DSP 58 as 32-bit data.

In the construction of FIG. 11, it is assumed that the data length latched in the latch 52 is 8 bits, the data length in each of the FIFOs $46_1$ to $46_4$ is also 8 bits, and the data length which can be dealt with in the DSP 58 is 32 bits.

In FIG. 13, the condition that data stored in the FIFOs $46_1$ to $46_4$ is transferred to the DSP 58 side is shown. Thus, data items from the FIFOs $46_1$ to $46_4$ are assigned to the respective data portions from the upper digit position to the lower digit position and transferred. Of course, the relation between the upper digit position and the lower digit position is not limited to that shown in FIG. 13.

The DSP 58 uses a working RAM 62 as a work area according to the software stored in a program ROM 60 and demodulates bar code information based on the width information items. However, in this case, it is required for the software to determine which of the upper digit position and lower digit position of data transferred to the DSP 58 side is the first digit position on the time base. Decoded data is output by the decoding result outputting section 36.

In order to read out new data written into the FIFO, the write pointer and read pointer must satisfy the following conditions. That is, the write pointer must always be set before the read pointer and should not pass the read pointer. Further, a relative address pointer width larger than a preset width is set for the read and write pointers according to the type of the FIFO.

The management of the above pointer is effected by use of an up/down counter 64 and pointer management block 66 in the circuit of FIG. 11. An example of the concrete operation of the management of the pointers is shown in FIG. 14.

The up/down counter 64 effects the counting-up operation in response to an instruction of writing data into the FIFOs $46_1$ to $46_4$ and the counting-down operation in response to an instruction of reading data from the FIFOs $46_1$ to $46_4$. The writing instruction applied to only one of the systems of a plurality of FIFOs $46_1$ to $46_4$ is used. In FIG. 11, the write instruction applied to the FIFO "A" $46_1$ is used. Thus, when one data item is written into each of the FIFOs $46_1$ to $46_4$, the pointer count is incremented by "1". Further, the up/down counter 64 is cleared by the readout starting instruction. As a result, an output of the up/down counter 64 becomes a relative pointer difference between the read pointer and the write pointer.

The relative pointer difference is input to a relative pointer comparing section 66A disposed in the pointer management block 66. According to the result of comparison, the read/write enable/disable condition for the FIFOs $46_1$ to $46_4$ is controlled.

Figure 14:
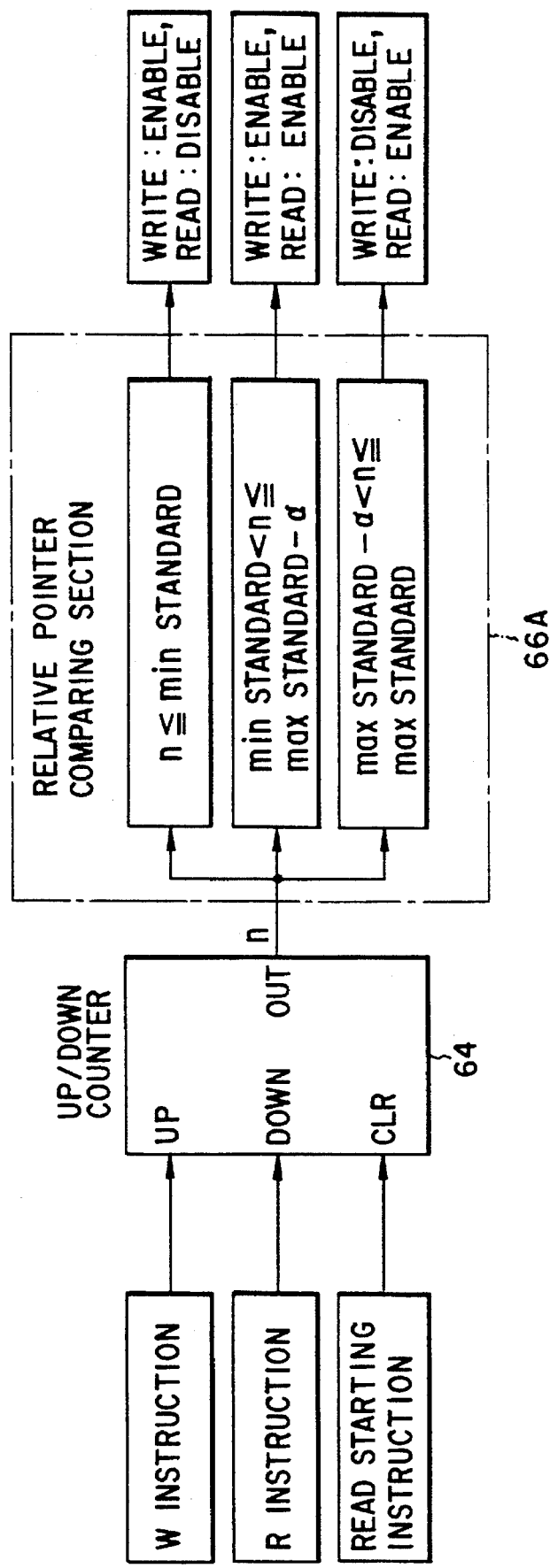
FIG. 14 is a diagram for illustrating a concrete example of the operation for pointer management.

With the circuit of FIG. 14, the reading operation is not effected until the write pointer is set to a position which is ahead of the read pointer by the minimum relative pointer width defined by the standard of the FIFO.

When the count is further incremented, the count output (n) exceeds the minimum relative pointer width (min. standard) defined by the standard of the FIFO and is equal to or smaller than a difference between the maximum relative pointer width (max. standard) defined by the standard of the FIFO and α, the write/read operation is effected. In this case, α indicates the estimated maximum number of data items read by one scanning operation of the linear sensor 12.

Further, when the count output exceeds the difference between the maximum relative pointer width defined by the standard of the FIFO and α and is not larger than the maximum relative pointer width defined by the standard of the FIFO, only the read operation is effected.

As a result, it becomes possible to prevent occurrence of a problem that the relative address pointer exceeds the maximum relative pointer width (or the write address pointer overtakes the read address pointer) while serial data from the linear sensor 12 is being written into the FIFOs $46_1$ to $46_4$, and as a result, the writing operation into the FIFOs 56A to 56D must be interrupted on the half-way of one-scanning data.

Figure 15:
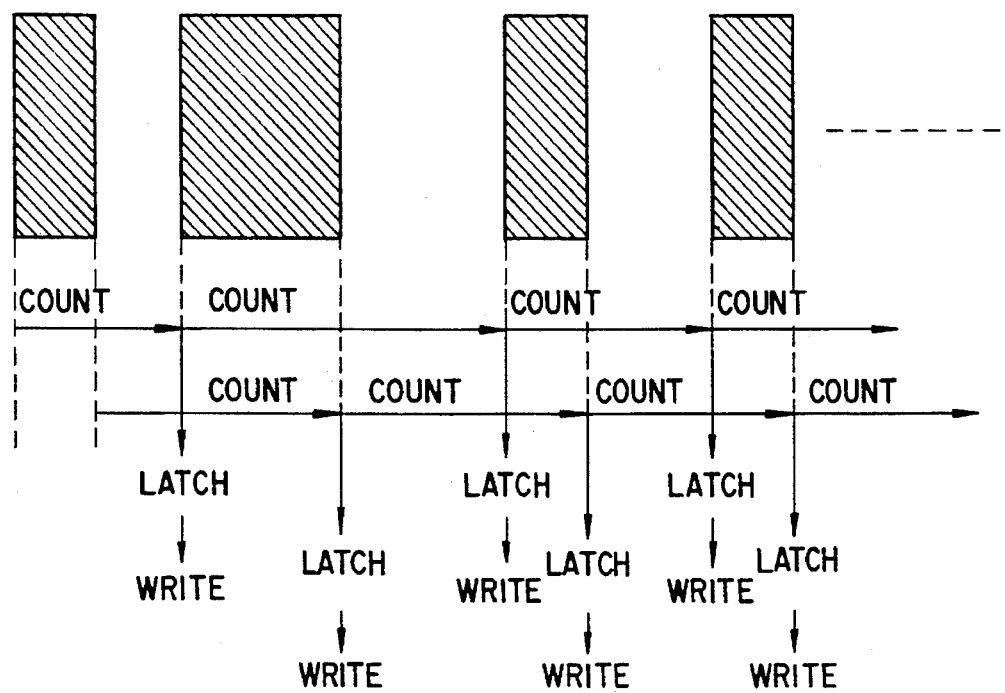
FIG. 15 shows the relation between the counting, latching and writing operations by use of another method.

Further, as data stored in the memories $46_1$ to $46_4$, a value obtained by adding together the widths of the adjacent space and bar, for example, the width between an edge of variation from the space to the bar and a next edge of variation from the space to the bar or the width between an edge of variation from the bar to the space and a next edge of variation from the bar to the space as shown in FIG. 15, may be stored into the memories. The above width counting method can be effectively used even when the printing precision is low and the bar width is larger or smaller than the specified value. Further, it is possible to replace the intensity of light reflected from the bar code by data used for storing a value subjected to the A/D conversion.

Further, in the above embodiment, data transfer is effected from the memories $46_1$ to $46_4$ to the DSP 58, but it is not limited to this data transfer. For example, when the working RAM 62 shown in FIG. 11 has 32-bit data length, it is possible to transfer data to the working RAM 62 instead of the DSP 58.

Further, as the memory, FIFOs such as the FIFOs $46_1$ to $46_4$ shown in FIG. 11 can be used, but the memory is not limited to the FIFO, but other memory elements such as a dual port RAM, static RAM, dynamic RAM can be used.

The method of this embodiment can be applied not only to the bar-code information reading apparatus but also to a data read/write device in a character scanner (OCR), for example, and thus it can be used in a wide application field.

In the first to third embodiments, data reading and storing timings into the memory are explained, but timings of the reading process including the decoding process and the reading and storing process are not specifically explained. Therefore, the timing of the reading process is explained by using a reading apparatus which reads bar code information when a card having a bar code label attached thereto is moved along the guide.

Figure 16:
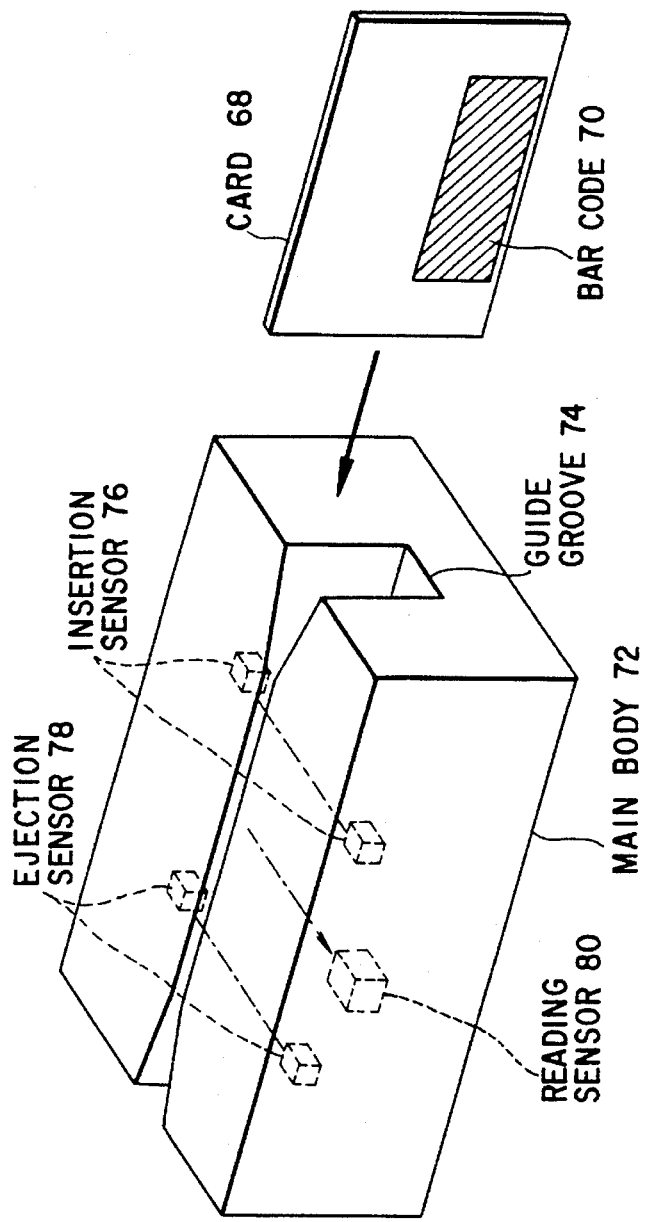
FIG. 16 is a view showing an example of the construction of a bar-code information reading apparatus, for illustrating the reading and storing timings in the first to third embodiments of this invention.

FIG. 16 is a perspective view showing a first example of the construction of such a reading apparatus. A bar code 70 is printed on or attached to a card 68 used as an information recording medium. The operator holds the card 68 by hand and slides the same along a guide groove 74 formed in the upper surface of the main body 72 of the reading apparatus.

When the card 68 is inserted into the groove, it first passes an insertion sensor 76, passes an ejection sensor 78 and is then discharged. The insertion and ejection sensors 76, 78 may be any type of sensors if they can detect the presence or absence of the card 68 in the respective positions, for example, a photo-interrupter, proximity sensor, or microswitch can be used.

Figure 17A:
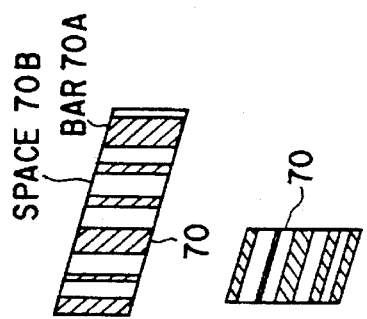
FIGS. 17A and 17B are diagrams showing the bar code arrangements on cards.
Figure 17B:
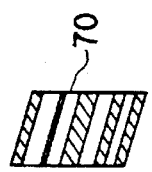

A reading sensor 80 is disposed between the insertion sensor 76 and the ejection sensor 78. The reading sensor 80 is used to read the bar code information. As the reading sensor 80, the following sensors may be used, for example. In the case of bar code as represented by JAN code, bars and spaces are arranged in a linear direction and information is recorded in this direction. Therefore, as shown in FIG. 17A, when the arrangement direction of bars 70A and spaces 70B is the same as the moving direction of the card 68, the reading sensor 80 may be a photodiode which can detect the intensity of light reflected from one position. Alternatively, as shown in FIG. 17B, when the arrangement direction of bars 70A and spaces 70B is transverse to the moving direction of the card 68, the reading sensor 80 may be the line sensor 12 (linear CCD) which is used in the first to third embodiments and which can detect the intensity of light reflected from the line. In this case, the arrangement direction of detectors of the line sensor 12 is set in the same direction as the arrangement direction of the bars 70A and spaces 70B.

In the main body 72 of the reading apparatus, various circuits such as a control circuit for effecting the decoding process by using an output of the reading sensor 80 as shown in the first to third embodiments and an interface circuit for outputting the decoding result to an external host device are provided although not shown in the drawing.

Figure 18:
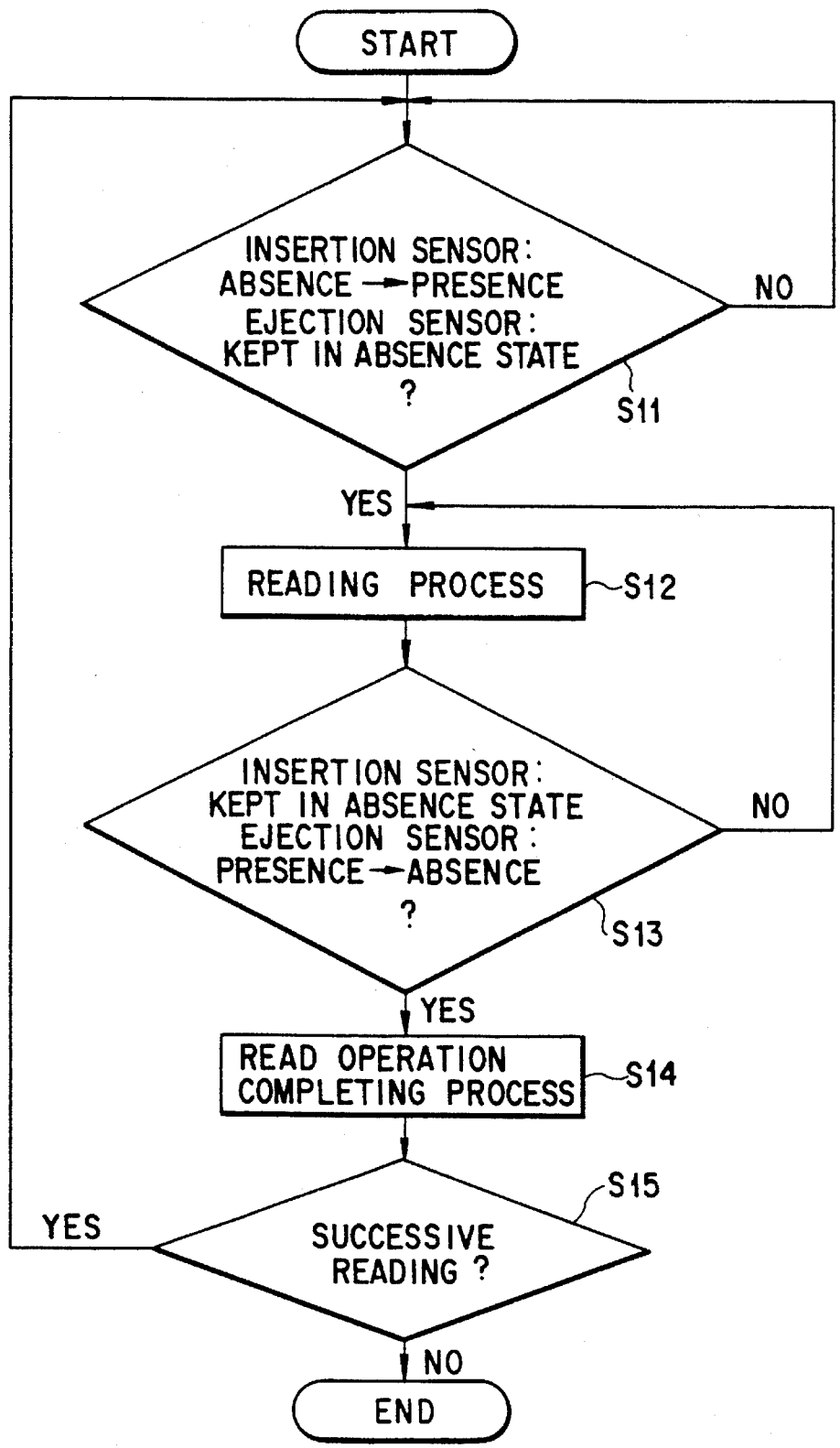
FIG. 18 is a flowchart for illustrating the operation of the bar-code information reading apparatus of FIG. 16.

FIG. 18 is a flowchart for illustrating the flow of operation of a control circuit when the bar-code information reading apparatus of FIG. 16 is used. When a detection output of the insertion sensor 76 is changed from the absence detection state indicating the absence of the card 68 to the presence detection state (step S11) while a detection output of the ejection sensor 78 is kept in the absence detection state indicating the absence of the card 68, the reading process using the reading sensor 80 is started (step S12). The reading process is continuously effected if the detection output of the insertion sensor 76 is kept in the absence detection state after it is changed from the presence detection state to the absence detection state and the detection output of the ejection sensor 78 is kept in the presence detection state after it is changed from the absence detection state to the presence detection state. If the detection output of the ejection sensor 78 is changed from the presence detection state to the absence detection state (step S13) when the detection output of the insertion sensor 76 is kept in the absence detection state, the reading operation completing process is effected (step S14). If a next card 68 is successively read (step S15), the process of the steps S11 to S14 is repeatedly effected.

Thus, the ejection state is set up at the instant that it is detected that a detection output of the ejection sensor 78 is changed from the card detection state (presence detection state) to the non-detection state (absence detection state) while the insertion sensor 76 does not detect the card 68.

The ejection state is set up at the instant that the detection output of the ejection sensor 78 is changed from the card detection state to the non-detection state, but the ejection state can be set up in a state in which both of the insertion and ejection sensors are set in the absence-of-card detection state if the precise detection of ejection is not necessary. According to the flowchart, the bar code information is read only in a period from the time the card 68 is inserted until the card is discharged.

As described above, a plurality of medium sensors are used to detect ejection of the medium. More specifically, the insertion sensor 76 and ejection sensor 78 are provided, and it is determined that the medium is discharged if the insertion sensor 76 does not detect the medium and when the ejection sensor 78 which has detected the medium is set in such a state that no medium can be detected. Further, in this example, the sensors 76 and 78 are referred to as the insertion and ejection sensors for convenience of explanation, but the function thereof is not limited. That is, the apparatus can be constructed so as to cope with insertion of card in either direction.

Figure 19:
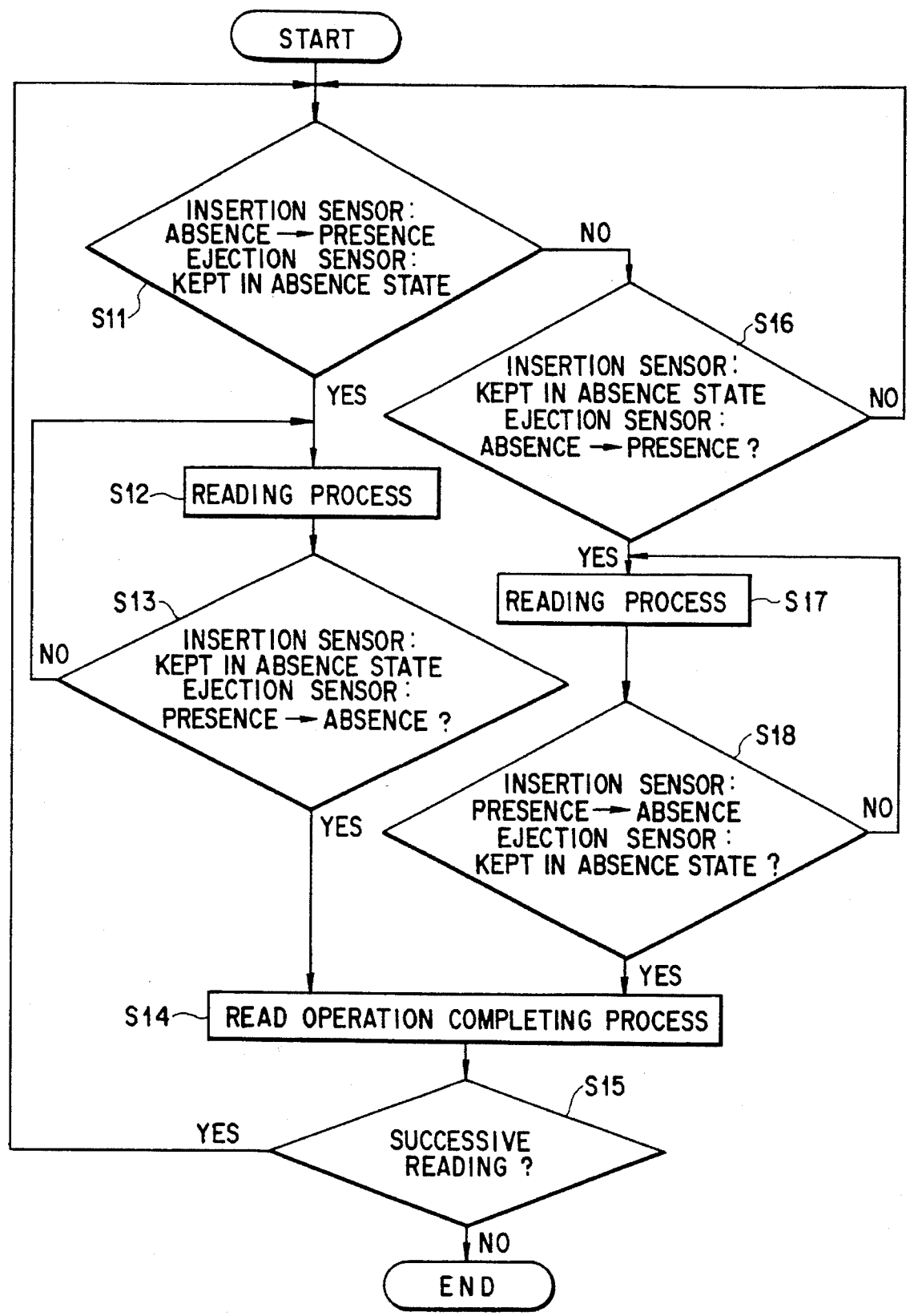
FIG. 19 is a flowchart for illustrating another operation of the bar-code information reading apparatus of FIG. 16.

FIG. 19 is a flowchart for illustrating another operation of the bar-code information reading apparatus of FIG. 16 which is constructed to permit the card 68 to be inserted in a reverse direction from the ejection sensor side in FIG. 16. The flowchart of FIG. 19 is different from that of FIG. 18 in that a new processing routine (steps S16 to S18) is provided to cope with insertion of the card 68 in a reverse direction. Therefore, only this part is explained. Even if it is determined in the step S11 that a detection output of the insertion sensor 76 is not set in a transition state from the absence detection state for the card 68 to the presence detection state thereof when a detection output of the ejection sensor 78 is kept in the absence detection state for the card 68, the reading process using a reading sensor 80 is started (step S17) if a detection output of the ejection sensor 78 is changed from the absence detection state for the card 68 to the presence detection state thereof (step S16) while a detection output of the insertion sensor 76 is kept in the absence detection state for the card 68. The reading process is continuously effected if a detection output of the ejection sensor 78 is kept in the absence detection state after it is changed from the presence detection state to the absence detection state and a detection output of the insertion sensor 76 is kept in the presence detection state after it is changed from the absence detection state to the presence detection state. Then, if a detection output of the insertion sensor 76 is changed from the presence detection state to the absence detection state (step S18) while a detection output of the ejection sensor 78 is kept in the absence detection state, the step S14 is effected to effect the reading operation completing process.

By effecting the above operation, it becomes possible to cope with insertion of the card in either direction.

That is, when the medium is inserted in either direction, insertion of the medium can be correctly detected and bar code information can be read. When the medium travels straightforwardly and is discharged, ejection of the medium is correctly detected and the operation of reading information of the recording medium is completed.

Figure 20:
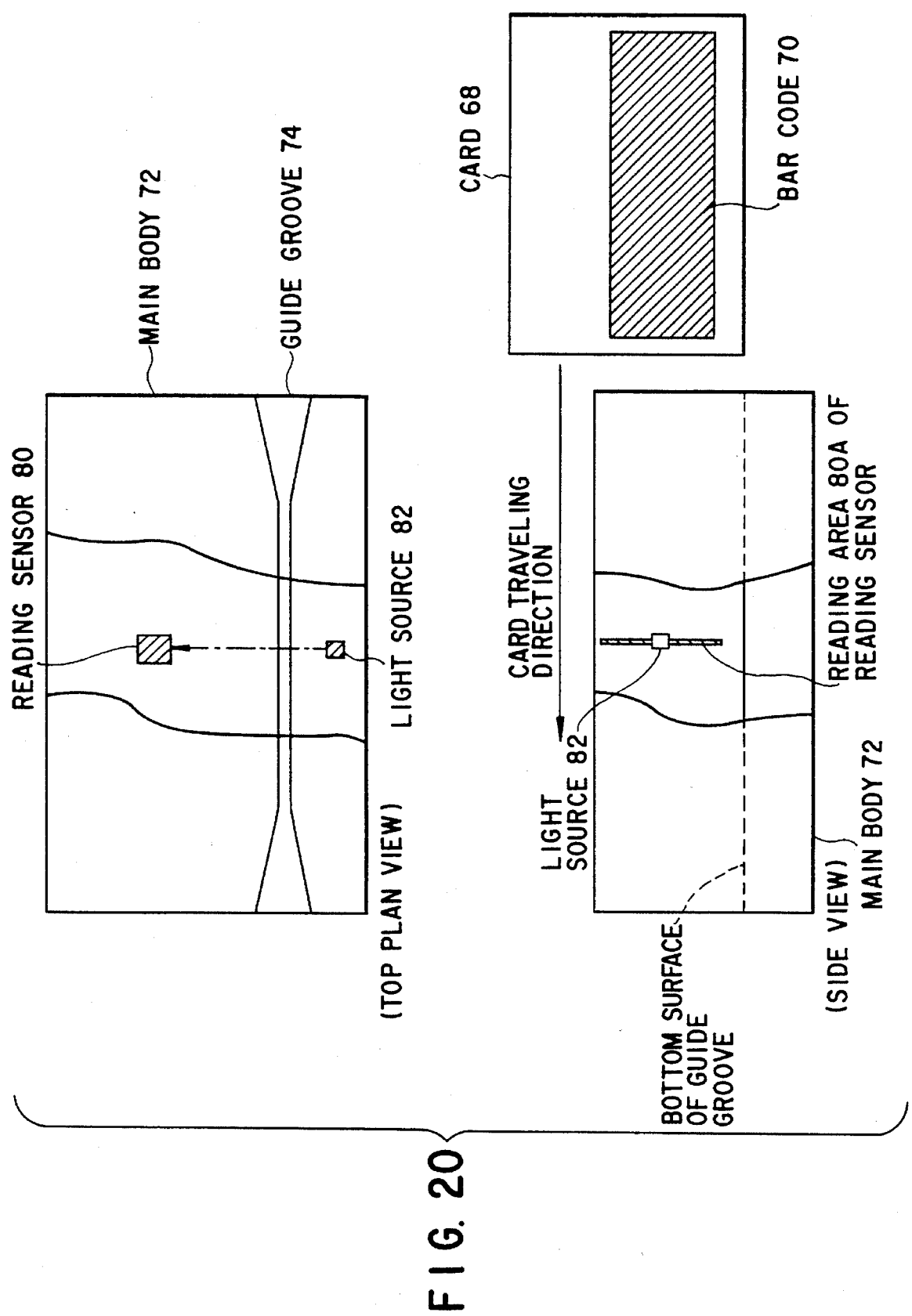
FIG. 20 is a view showing another example of the construction of the bar-code information reading apparatus.

FIG. 20 is a view showing an example of the construction of the bar-code information reading apparatus in a case where the card is detected only in one position of the bar code reading position.

The construction of the bar-code information reading apparatus is different from that of FIG. 16 in that the insertion sensor and ejection sensors are not used and a light source 82 is provided in a position facing a reading sensor 80. The reading sensor 80 is used as a detector for detecting light from the light source 82. As the light source 82, an LED, laser diode may be used, for example. Since light emitted from the light source 82 is illuminated on a reading area 80A of the reading sensor 80, the light is read by the reading sensor 80. The reading area 80A in FIG. 20 is defined in a case where a line sensor is used as the reading sensor 80. Therefore, in this example, some picture elements of the line sensor detect the light from the light emitting source 82 and output a corresponding signal.

If the light from the light source 82 in the reading area 80A is interrupted by insertion of the card 68, a signal indicating the light from the light source 82 is eliminated from the output signal of the line sensor. That is, the presence or absence of the card 68 in the reading area 80A can be determined by monitoring output signals from specified picture elements of the line sensor.

Figure 21:
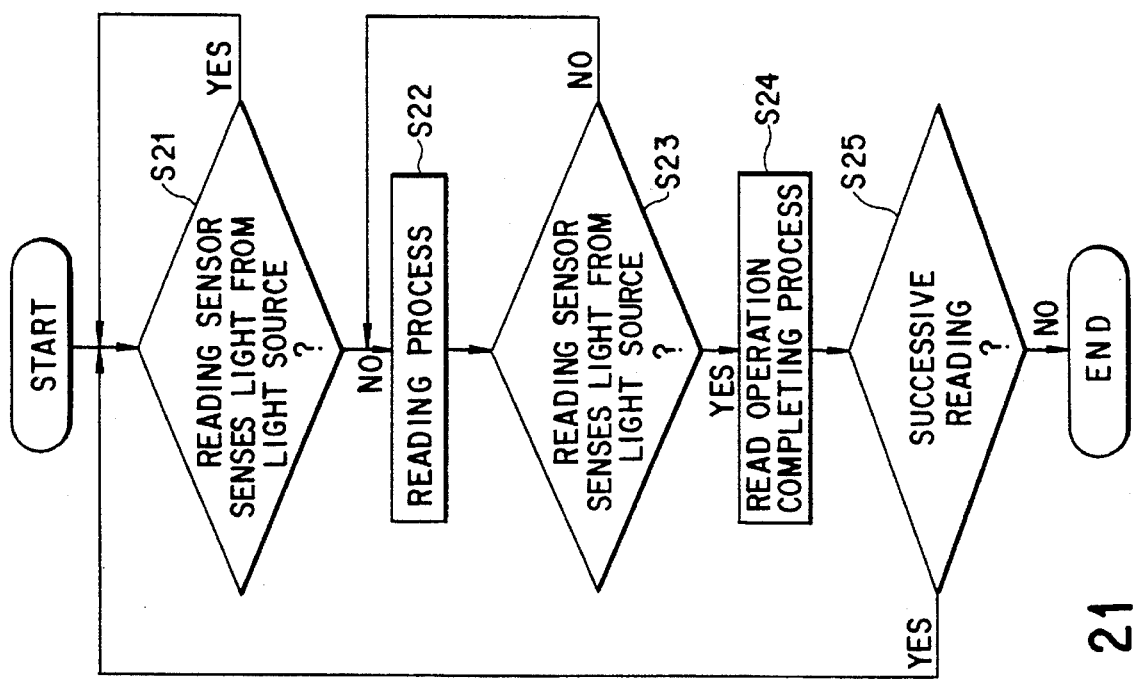
FIG. 21 is a flowchart for illustrating the operation of the bar-code information reading apparatus of FIG. 20.

FIG. 21 is a flowchart showing the operation flow in a case where the bar-code information reading apparatus of FIG. 20 is used. That is, when the light from the light source 82 in the reading area 80A is interrupted by insertion of the card 68 and the reading sensor 80 does not sense the light from the light emitting source 80 (step S21), the reading process using the reading sensor 80 is started (step S22). The reading process is continuously effected until the reading sensor 80 starts to sense the light from the light source 82 again. That is, when the reading sensor 80 starts to sense the light from the light source 82 again (step S23), the reading operation completing process is effected (step S24). If a next card 68 is successively read (step S25), the process of the steps S21 to S24 is repeatedly effected.

FIG. 22 is a view showing still another example of the construction of the bar-code information reading apparatus in a case where a method for detecting a card only in one position of the bar code reading position is used as another detection means for insertion and ejection of the card.

The construction of the bar-code information reading apparatus is different from that of FIG. 20 in that an exclusive-use card sensor 84 is used for detection of the presence or absence of the card instead of using the light emitting source and reading sensor. As the card sensor 84, a photo-interrupter, proximity sensor or microswitch may be used, for example. It is necessary to arrange the card sensor 84 in the same position as the reading area 80A in the card moving direction and in a position so as not to obstruct the bar code reading. Therefore, in the example of FIG. 22, the card sensor 84 is disposed below the reading area 80A. Like the construction of FIG. 20, with the above construction, it is possible to detect the presence or absence of the card 68 according to a sensor output of the card sensor 84.

Figure 23:
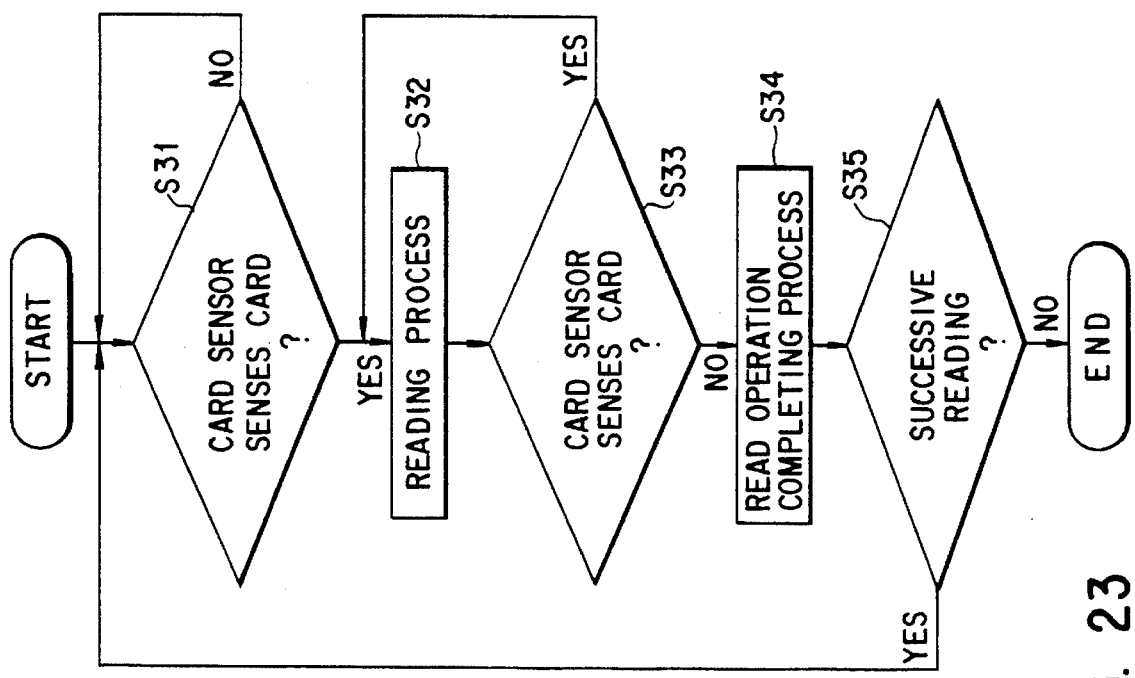
FIG. 23 is a flowchart for illustrating the operation of the bar-code information reading apparatus of FIG. 22.

FIG. 23 is a flowchart showing the operation flow in a case where the bar-code information reading apparatus of FIG. 22 is used. That is, if the front end of the card 68 has reached the reading area 80A after insertion of the card 68, the card sensor 84 senses the card 68 (step S31) and the reading process using the card sensor 84 is started (step S32). The reading process is continuously effected if the card sensor 84 senses the card 68. That is, if the card sensor 84 comes to detect the absence of the card 68 (step S33), the reading operation completing process is effected (step S34). If a next card 68 is successively read (step S35), the process of the steps S31 to S34 is repeatedly effected.

As described above, it is possible to detect the insertion and ejection of the card 68 only in one position of the bar code reading position. That is, insertion of the medium can be correctly detected even if the medium is inserted in either direction and then bar code information is read. If the medium travels straightforwardly and is discharged, ejection of the medium is correctly detected and the operation of reading information of the recording medium is completed. As the sensor for detection of the card, an exclusive-use sensor (card sensor 84) may be used or the reading sensor 80 may be used.

A method for detecting ejection of the card by use of the sensor is explained, but if it is not necessary to effect the reading operation completing process as shown in the flowchart immediately after ejection of the card, ejection of the card can be detected in the following manner. That is, as the sensor, only the insertion sensor is used and ejection of the card is determined by completing the decoding process. As a result, even when the card is not yet discharged, the reading operation completing process can be effected only if the decoding process is completed, thereby making it possible to reduce the decoding time. However, when considering that there is a possibility that the decoding process is completed while the card is passing the insertion sensor in the successive reading state, it is better to detect the insertion of the card by detecting the transition from the card detecting state to the no-card detecting state. This solves a problem that the same card will be read twice. Further, the position of the insertion sensor is set in the same position as or in front of the reading area.

With the above construction, a card is used as the medium, but it is not limited to the card, and the apparatus can be applied for detection of insertion and ejection of a sheet-form plate or corrugated cardboard box having a bar code printed thereon. Further, in the case of FIG. 16, the card is manually moved by the operator, but it is also possible to move the card by use of an automatic carrying system using a driving roller.

What is claimed is:

1. A bar-code information reading apparatus, comprising:
    detection means for time-sequentially detecting an intensity of reflected light of a bar code, wherein the bar code includes bars and spaces;
    conversion means for counting data representing a time-series of bars and spaces obtained by said detection means, and for converting the same into width information of the bar code;
    a memory for storing the width information; and
    timing control means for controlling said conversion means to convert only data, which is included in data obtained by the detection means and which is subsequent to data corresponding to a preset width, into said width information, whereby the memory stores only width information which is subsequent to the data corresponding to the preset width.

2. The apparatus according to claim 1, wherein said timing control means includes:
    setting means for setting said preset width;
    width counting means for counting a width corresponding to said preset width set by said setting means; and
    means for causing said conversion means to start a conversion operation when said width counting means has counted said preset width.

3. The apparatus according to claim 1, wherein:
    said detection means includes a line sensor having a reading range larger than an entire width of a bar code to be read; and
    said preset width is a width between one end on the read starting side of the reading range of said line sensor and a position in which the bar code is assumed to be present.

4. The apparatus according to claim 1, further comprising decoding means for decoding width information stored in said memory.

5. A bar-code information reading apparatus comprising:
    detection means for time-sequentially detecting an intensity of reflected light of a bar code, wherein the bar code includes bars and spaces;
    conversion means for counting data representing a time-series of bars and spaces obtained by said detection means, and for converting the same into width information of the bar code;
    a memory for storing the width information;
    bar code detecting means for detecting a head portion of the bar code based on data representing the time-series of bars and spaces obtained by said detection means;
    detection controlling means for operating said bar code detecting means for that part of the data from said detection means which comes after data corresponding to a preset width; and
    timing control means for controlling a start timing of a conversion operation performed by said conversion means, so that said memory stores width information that is obtained after said bar code detecting means detects the head portion of the bar code.

6. The apparatus according to claim 5, wherein said detection controlling means includes:
    setting means for setting said preset width;
    width counting means for counting a width corresponding to said preset width set by said setting means; and
    means for causing said bar code detecting means to start a detecting operation when said width counting means has counted said preset width.

7. The apparatus according to claim 5, wherein:
    said detection means includes a line sensor having a reading range larger than an entire width of a bar code to be read; and said preset width is a width between one end on the read starting side of the reading range of said line sensor and a position lying in front of a position in which the bar code is assumed to be present.

8. The apparatus according to claim 5, wherein said timing control means includes means for causing said conversion means to start the conversion operation when said bar code detecting means has detected the head portion of the bar code.

9. The apparatus according to claim 5, wherein;

said detection means includes a line sensor having a reading range larger than an entire width of a bar code to be read; and said bar code detecting means includes means for detecting that an output of said line sensor is first changed to a signal corresponding to the bar.

10. The apparatus according to claim 5, further comprising decoding means for decoding width information stored in said memory.

11. A bar-code information reading apparatus comprising:

detection means for time-sequentially detecting an intensity of reflected light of a bar code, wherein the bar code includes bars and spaces;

conversion means for counting data representing a time-series of bars and spaces obtained by said detection means, and for converting the same into width information of the bar code;

a memory for storing the width information;

bar code detecting means for detecting a head portion of the bar code based on data representing a time-series of bars and spaces obtained by said detection means; and timing control means for controlling said conversion means to start a conversion operation when said bar code detecting means has detected the head portion of the bar code, so that said memory stores only width information that is obtained after said bar code detecting means detects the head portion of the bar code.

12. The apparatus according to claim 11, wherein:

said detection means includes a line sensor having a reading range larger than an entire width of a bar code to be read; and said bar code detection means includes means for detecting that an output of said line sensor is first changed to a signal corresponding to the bar.

13. The apparatus according to claim 11, further comprising decoding means for decoding width information stored in said memory.

* * * * *